(12) United States Patent
Noro et al.

(10) Patent No.: US 6,481,523 B1
(45) Date of Patent: Nov. 19, 2002

(54) REAR SWING ARM SUPPORTING STRUCTURE FOR A MOTORCYCLE

(75) Inventors: Hirofumi Noro, Saitama (JP); Kiyoshi Fukasawa, Saitama (JP); Toshihisa Nagashii, Saitama (JP); Kenji Hasegawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/652,780

(22) Filed: Aug. 31, 2000

(30) Foreign Application Priority Data

Aug. 31, 1999 (JP) ............................. 11-245152

(51) Int. Cl.⁷ ............................................. B62D 61/02
(52) U.S. Cl. ...................................... 180/227; 280/284
(58) Field of Search ................................ 180/219, 227; 280/284, 291

(56) References Cited

U.S. PATENT DOCUMENTS

| | | | | |
|---|---|---|---|---|
| 4,671,375 A | * | 6/1987 | Oike et al. ................. | 180/227 |
| 5,383,530 A | * | 1/1995 | Shiohara .................... | 180/227 |
| 5,531,289 A | * | 7/1996 | Muramatsu .................. | 180/227 |
| 6,024,185 A | * | 2/2000 | Okada et al. ............... | 180/227 |
| 6,189,638 B1 | * | 2/2001 | Ito et al. ..................... | 180/227 |

FOREIGN PATENT DOCUMENTS

| | | | | |
|---|---|---|---|---|
| GB | 1477479 | * | 6/1977 | ................. 180/227 |
| IT | 413537 | * | 5/1946 | ................. 180/227 |
| JP | 2-85086 | * | 3/1990 | ................. 180/227 |
| JP | A10115226 | | 5/1998 | |
| WO | 89/06203 | * | 7/1989 | ................. 180/227 |

* cited by examiner

*Primary Examiner*—Daniel G. DePumpo
(74) *Attorney, Agent, or Firm*—Birch, Stewart, Kolasch & Birch, LLP

(57) ABSTRACT

A motorcycle in which a front end portion of a rear swing arm for rotatably supporting a rear wheel is swingably supported via a supporting shaft by an engine supported by a body frame. The rigidity of a rear swing arm is enhanced without increasing the weights of the supporting shaft and the like. Upper end portions of a pair of right and left bracket are fixed to both ends of a supporting shaft. A cross-pipe connects lower end portions of the brackets and is fixed to the engine at a position under the supporting shaft. A pair of right and left rotatably supporting portions are swingably supported by the supporting shaft at positions between the brackets and the engine.

10 Claims, 9 Drawing Sheets

REAR SWING ARM SUPPORTING STRUCTURE FOR A MOTORCYCLE

BACKGROUND OF THE INVENTION

1. Field of the Invention

The present invention relates to a motorcycle in which a front end portion of a rear swing arm for rotatably supporting a rear wheel is swingably supported via a supporting shaft by an engine supported by a body frame, and particularly to an improved structure for supporting the rear swing arm to the engine.

2. Background Art

A motorcycle having a rear swing arm is known, for example, from Japanese Patent Laid-open No. Hei 10-115226. This motorcycle, however, has a shortcoming: because a pair of right and left rotatably supporting portions provided at a front end portion of a rear swing arm are swingably supported by both ends of a supporting shaft projecting from an engine, (both the rotatably supporting portions are supported in a cantilever manner only by the engine via the supporting shaft) the supporting shaft must be reinforced in order to reinforce the rigidity of the rear swing arm supported by the engine. This increases the weight of the motorcycle.

In light of this shortcoming, an object of the present invention is to provide a rear swing arm supporting structure for a motorcycle capable of enhancing the rigidity of a rear swing arm and having a reduced weight.

SUMMARY OF THE INVENTION

According to an embodiment of the invention, a rear swing arm supporting structure is provided in which a front end portion of a rear swing arm for rotatably supporting a rear wheel is swingably supported via a supporting shaft by an engine supported by a body frame. Upper end portions of a pair of right and left brackets are fixed to both ends of the supporting shaft supported by the engine, and a cross-member portion for connecting lower end portions of the brackets to each other is fixed to the engine at a position under the supporting shaft. A pair of right and left rotatably supporting portions provided at the front end portion of the rear swing arm are swingably supported by the supporting shaft at positions between the brackets and the engine.

In this embodiment, the right and left brackets are supported by the engine via the supporting shaft, and also supported by the engine via the cross-member portion for connecting both the brackets to each other. Both of the rotatably supporting portions provided at the front end portion of the rear swing arm are swingably supported between the engine and both the brackets forcibly supported by the engine at a plurality of positions. As a result, it is possible to enhance the rigidity of the rear swing arm supported by the engine while avoiding undue weight of the supporting shaft and the like.

The brackets have respective shaft holes in which both the ends of the supporting shaft passing through the engine with its relative axial position between the rotatably supporting portions fixed are to be inserted. One or two of the brackets have slit portions continuous to the inner surfaces of the shaft holes of the brackets, and fastening bolts for reducing the widths of the slit portions to reduce the diameters of the shaft holes. With this configuration, it is possible to easily position both the rotatably supporting portions along the axial line of the supporting shaft, irrespective of the accuracy of the gap between both side surfaces of a portion supporting the supporting shaft, of the engine and both the brackets, and the accuracy of the widths of both the rotatably supporting portions, and to easily fix the brackets to both the ends of the supporting shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
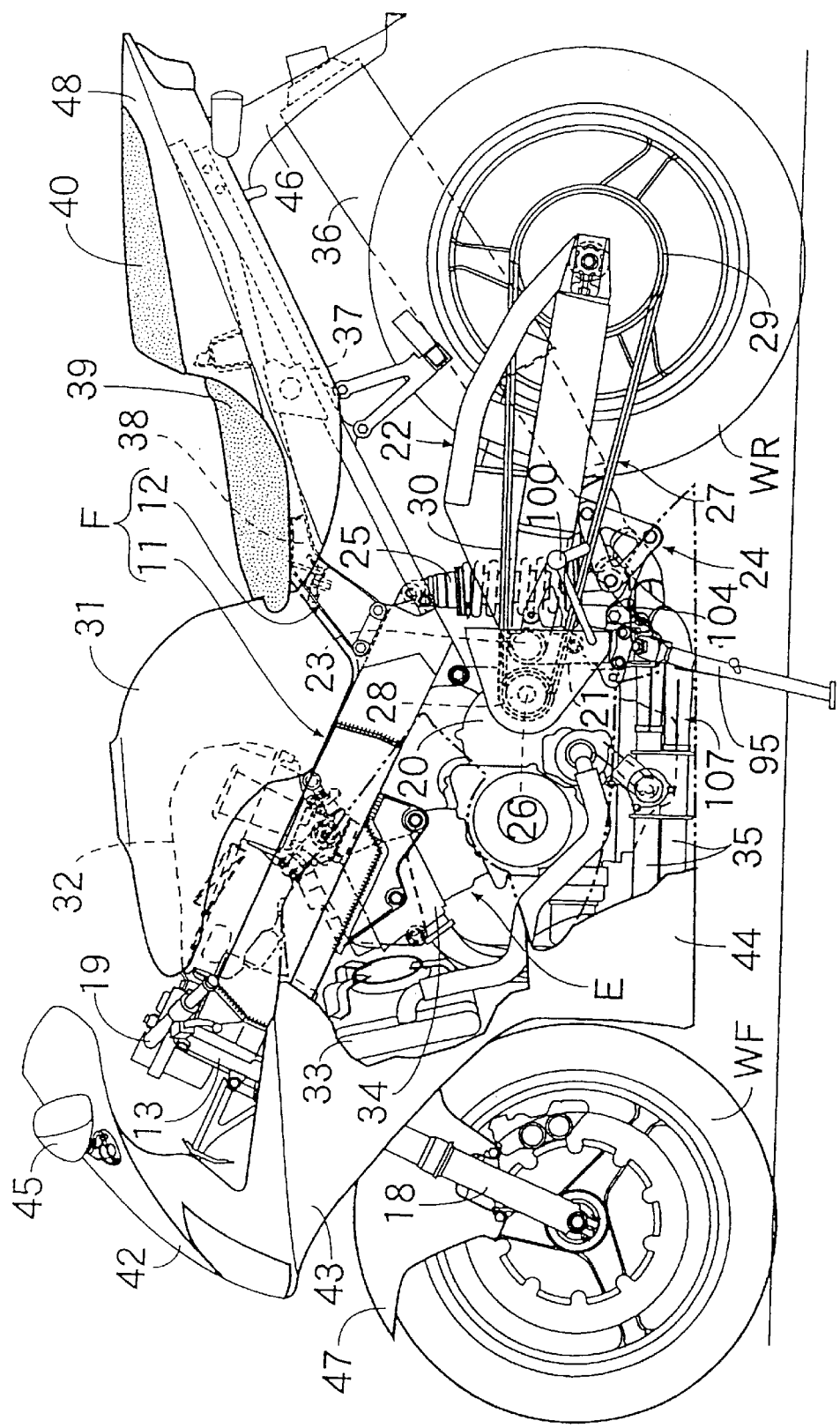
FIG. 1 is side view of a motorcycle according to the invention.

Referring first to FIG. 1, a body frame F of this motorcycle includes a front frame 11 on which an engine E is mounted, and a rear frame 12 connected to the rear end of the front frame 11. A head pipe 13 is provided at the front end of the front frame 11. A front fork 18 supports a front wheel WF via the head pipe 13. A handlebar 19 is connected to the upper end of the front fork 18.

The engine E is of a multi-cylinder type in which a plurality of cylinders, for example, four cylinders are disposed in parallel along the width direction of the body frame F. The engine E is supported by the front frame 11. An arm supporting member 21 is supported by a rear portion of a crank case 20 of the engine E. A front end portion of a rear swing arm 22 for rotatably supporting a rear wheel WR is swingably supported by the arm supporting member 21 via a supporting shaft 23. A link mechanism 24 is provided between the arm supporting member 21 and the rear swing arm 22. A rear cushion unit 25 is provided between the link mechanism 24 and a rear portion of the front frame 11.

Power from an output shaft 26 of a transmission contained in the engine E is transmitted to the rear wheel WR via chain transmission means 27. The chain transmission means 27 includes a drive sprocket 28 fixed to the output shaft 26, a driven sprocket 29 fixed to the rear wheel WR, and an endless chain 30 wound around the sprockets 28 and 29. The chain transmission means 27 is disposed on the left side of the engine E (as seen along the forward movement direction of the motorcycle).

A fuel tank 31 is supported by the front frame 11, and a front portion of the rear frame 12 is disposed over the engine E. An air cleaner 32 is disposed between the fuel tank 31 and the engine E, and a radiator 33 is disposed in front of the engine E.

A plurality of exhaust pipes, for example, four exhaust pipes 35, are connected to a cylinder head 34. The exhaust pipes 35 project forwardly from the engine E, pass under the engine E, and extend on the right side of the rear wheel WR. The exhaust pipes 35 are then connected to an exhaust muffler 36 disposed on the right side of the rear wheel WR.

The rear frame 12 includes a pair of right and left rear stays 37 extending rearwardly, upwardly from the rear end of the front frame 11, and a pair of right and left seat rails 38 extending rearwardly, upwardly from the rear end of the front frame 11. The seat rails 38 pass over the rear stays 37 and are connected to the rear ends of the rear stays 37. A main seat 39 is supported by the seat rails 38 at a position behind the fuel tank 31, and a pillion seat 40 on which a passenger is to sit is supported by the seat rails 38 at a position rearwardly from the main seat 39.

The front side of the head pipe 13 is covered with a synthetic resin front cowl 42. Both sides of a front portion of a vehicular body are covered with a synthetic resin center cowl 43 connected to the front cowl 42. Both sides of portions of the exhaust pipes 35 which are disposed under the engine E are covered with a synthetic resin lower cowl 44 connected to the center cowl 43. Rear view mirrors 45 are mounted on the right and left side surfaces of an upper portion of the front cowl 42.

A rear fender 46 for covering the upper side of the rear wheel WR is mounted on the rear frame 12. A front fender 47 for covering the upper side of the front wheel WF is mounted on the front fork 18. Most of the rear frame 12 and the rear fender 46 are covered with a rear cowl 48.

Referring to FIGS. 2 to 6, the arm supporting member 21 includes a pair of right and left brackets 52 and 53 vertically extending on both the sides of a rear portion of the crank case 20 of the engine E, and a cross-member portion 54 for connecting lower end portions of the brackets 52 and 53 to each other. The brackets 52 and 53 and the cross-member portion 54 are unitarily formed by casting.

The supporting shaft 23 includes a bolt 55 having at its one end (left end in FIG. 6) an enlarged diameter head 55a, and a nut 56 screwed to the other end (right end in FIG. 6) of the bolt 55. The bolt 55 passes through a rear portion of the crank case 20 of the engine E in the horizontal direction, to be thus supported by the crank case 20.

One or both (both in this embodiment) of the brackets 52 and 53 of the arm supporting member 21 have, at their upper portions, shaft holes 57 and 60 in which the enlarged diameter head 55a and the nut 56 located at both the ends of the supporting shaft 23 are inserted respectively. The shaft holes 57 and 60 have slit portions 58 and 61 continuous to the inner surfaces of the shaft holes 57 and 60 so as to be opened upwardly, respectively. Fastening bolts 59 and 62 are screwed in the slit portions 58 and 61, to narrow the widths of the slit portions 58 and 61, thereby reducing the diameters of the shaft holes 57 and 60, respectively.

The rear swing arm 22 includes, at its front end, a pair of right and left rotatably supporting portions 63 and 64. One rotatably supporting portion 63 is swingably supported by the supporting shaft 23 via a needle bearing 65 at a position between the bracket 52 of the arm supporting member 21 and a rear portion of the crank case 20. The other rotatably supporting portion 64 is swingably supported by the supporting shaft 23 via a ball bearing 66 at a position between the bracket 53 of the arm supporting member 21 and a rear portion of the crank case 20. An axial position of the supporting shaft 23 relative to both the rotatably supporting portions 63 and 64 of the rear swing arm 22 is determined by fastening the nut 56 to the other end of the bolt 55 until the enlarged diameter head 55a comes in contact with an outer end of an inner ring 65a of the needle bearing 65, and the nut 56 comes in contact with an outer end surface of an inner ring 66a of the ball bearing 66. In this state, the fastening bolts 59 and 62 are fastened to the slit portions 58 and 61, respectively, to thereby fix the upper end portions of the brackets 52 and 53 to both the ends of the supporting shaft 23.

A pair of right and left projecting portions 67 and 68, spaced from each other in the width direction of the vehicular body, are provided on an upper portion of the cross-pipe 54 of the arm supporting member 21. A bolt 69 having at its one end an enlarged diameter head 69a is inserted in a lower rear portion of the crank case 20 disposed between both the projecting portions 67 and 68, and a nut 70. The nut 70 is engaged with the outer surface of the projecting portion 68 and is screwed in the other end of the bolt 69.

One projecting portion 67 has a shaft hole 71 in which the enlarged diameter head 69a of the bolt 69 is inserted. The shaft hole 71 has a slit portion 72 continuous to the inner surface of the shaft hole 71 and opened upwardly. A fastening bolt 73 is screwed in the slit portion 72, to narrow the width of the slit portion 72, thereby reducing the diameter of the shaft hole 71. The other projecting portion 68 has a shaft hole 74 in which the bolt 69 is inserted.

An axial position of the bolt 69 is determined by fastening the nut 70 to the other end of the bolt 69 until the enlarged diameter head 69a inserted in the shaft hole 71 comes in contact with the side surface of a lower rear portion of the crank case 20, and in such a state, the fastening bolt 73 is fastened to the slit portion 72. In this way, the cross-member portion 54 is supported by the crank case 20 of the engine E.

Both the brackets 52 and 53 of the arm supporting member 21 have circular openings 75 and 76 for allowing the insertion/removal of the bolt 69 and the nut 70 and the fastening operation of the nut 70 to the bolt 69, respectively.

A pair of right and left projecting portions 77, spaced from each other in the width direction of the vehicular body, are provided on the front portion of the cross-member portion 54 of the arm supporting member 21. Both the projecting portions 77 are connected to the crank case 20 disposed between both the projecting portions 77 by means of bolts 78 and nuts (not shown).

To be more specific, the cross-member portion 54 of the arm supporting member 21 is supported by the crank case 20 even at the two locations separated downwardly from the supporting shaft 23, whereby the arm supporting member 21 can be forcibly supported by the engine E without swing motion of the arm supporting member 21 around the axial line of the supporting shaft 23.

Figure 2:
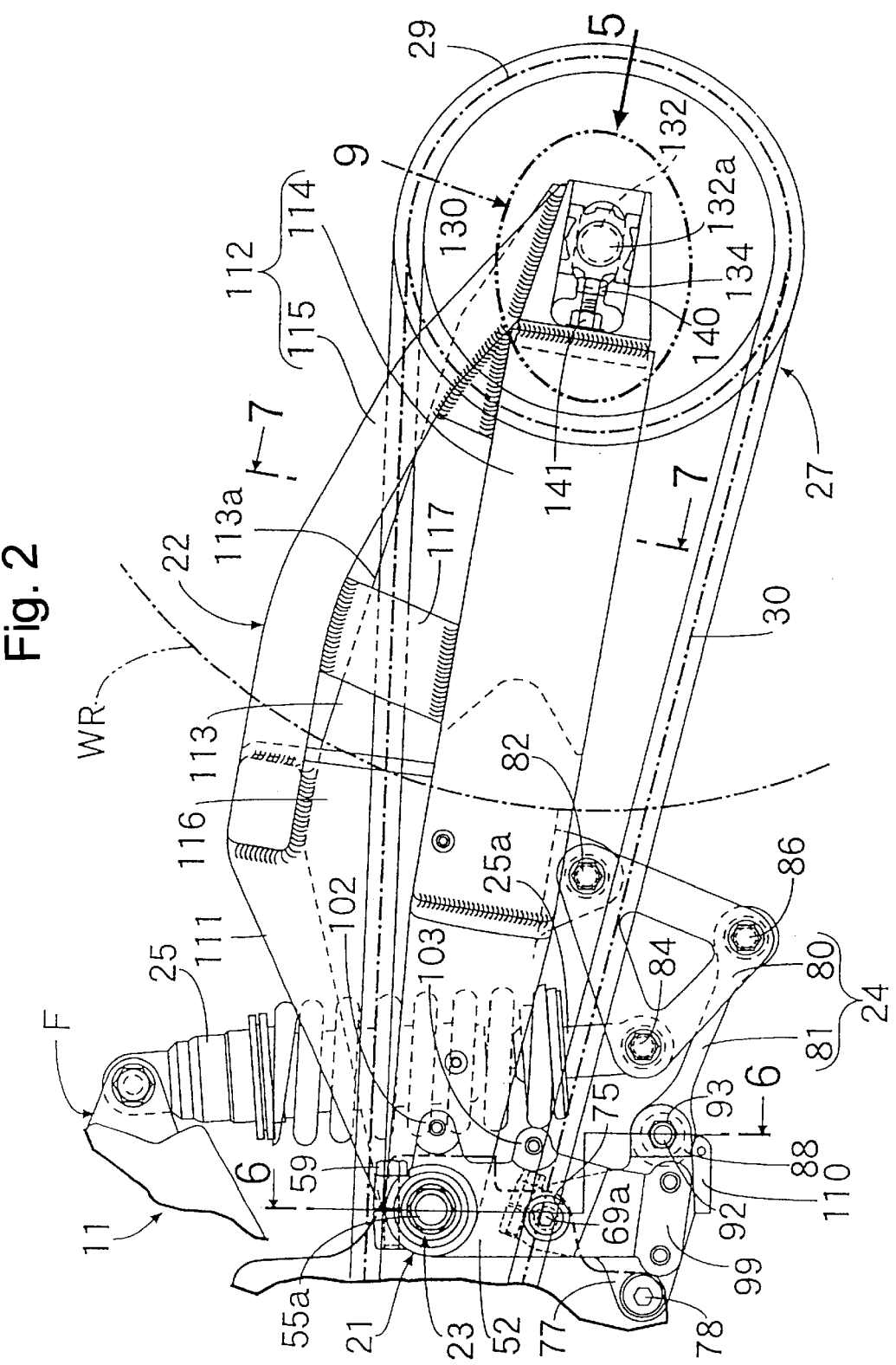
FIG. 2 is a side view showing a structure for supporting a rear swing arm according to the invention.
Figure 3:
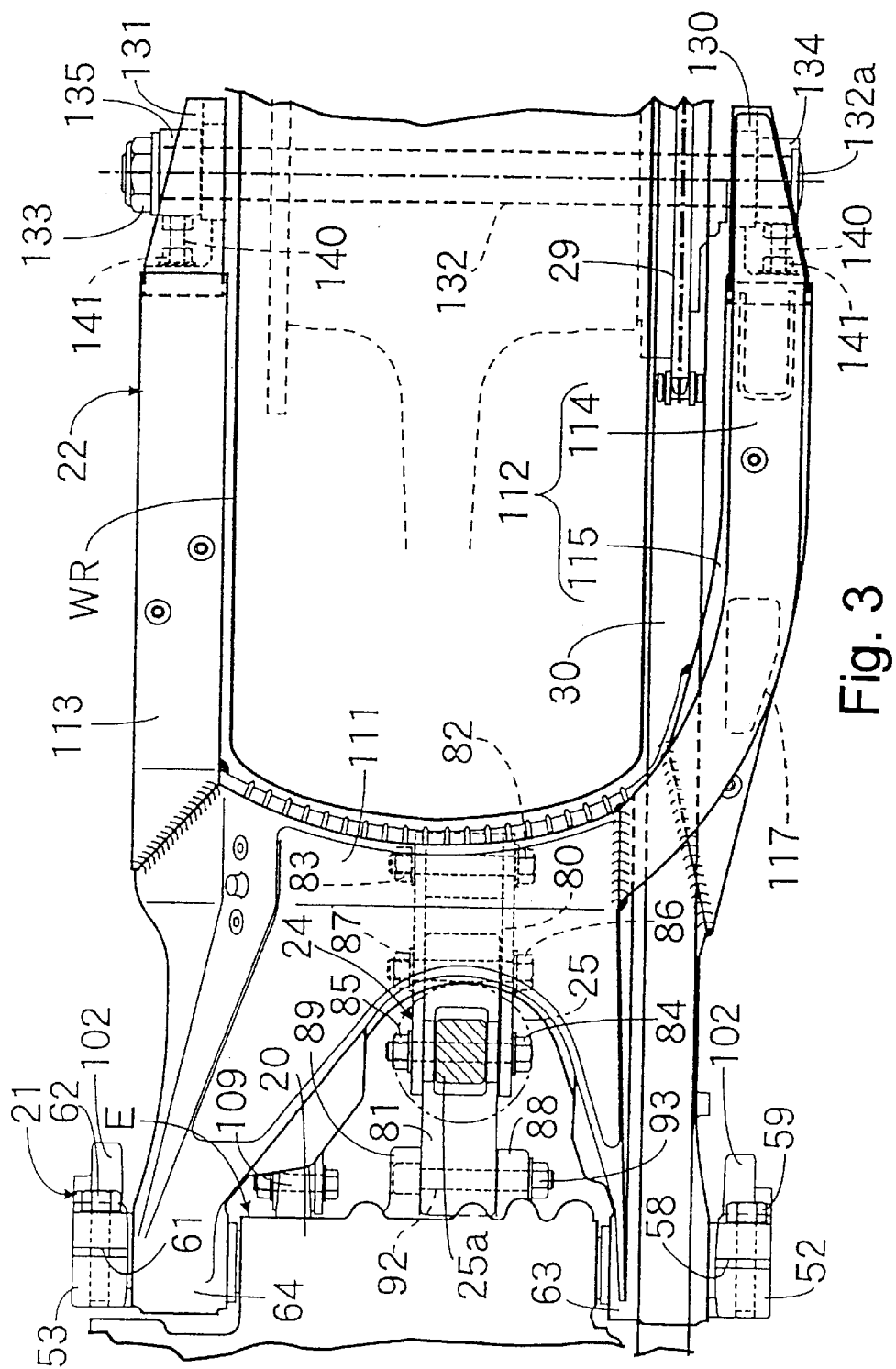
FIG. 3 is a transverse plan view of FIG. 2.
Figure 5:
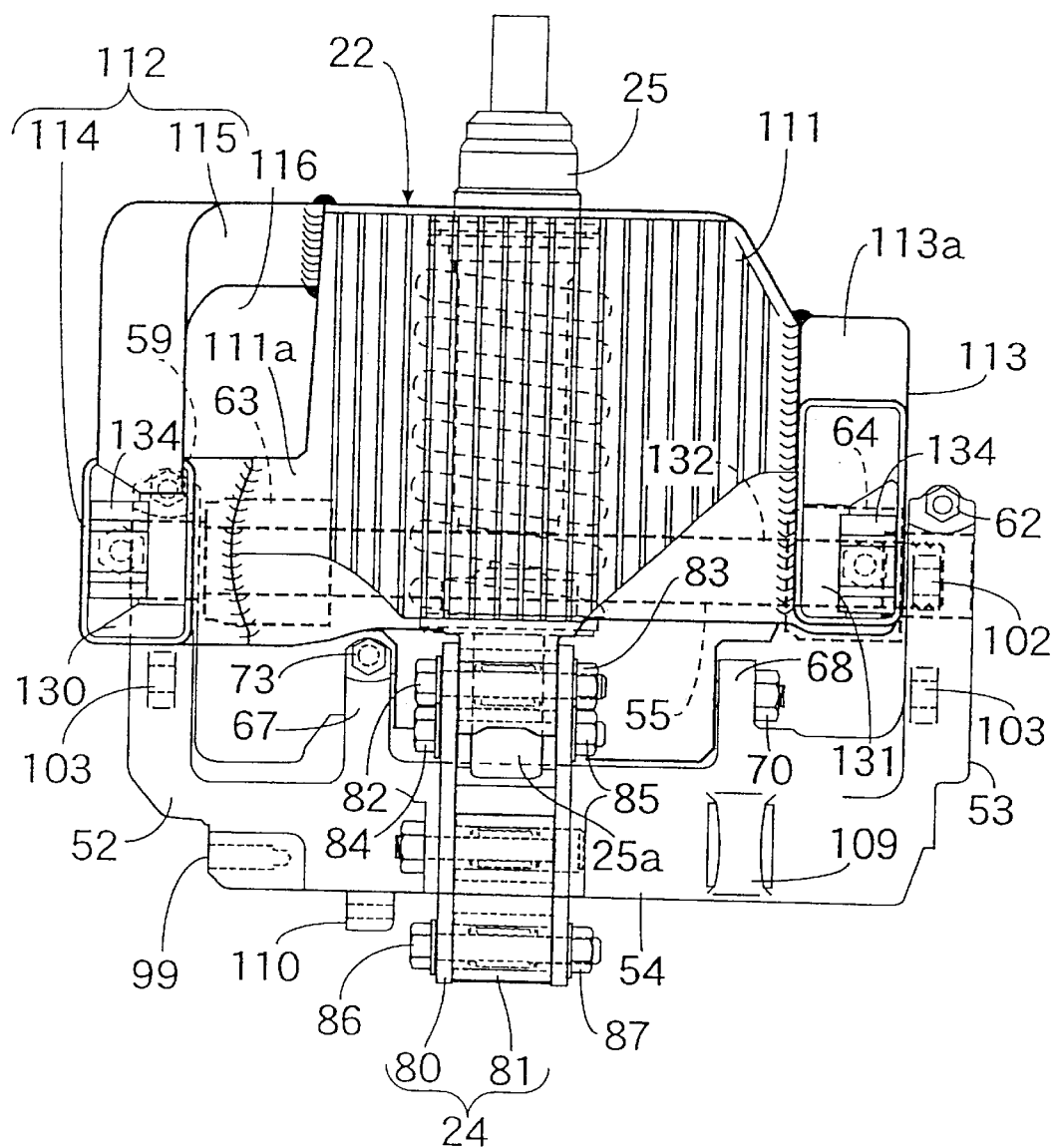
FIG. 5 is a view seen along the direction shown by arrow 5 of FIG. 2.

Referring particularly to FIGS. 2, 3 and 5, the link mechanism 24 includes a first triangular link member 80 a second straight link member 81. One vertex of the triangular first link member 80 is connected to a lower portion of the rear swing arm 22 by means of a bolt 82 and a nut 83. Another vertex of the triangular first link member 80 is connected to a lower end portion 25a of the rear cushion unit 25 by means of a bolt 84 and a nut 85. The remaining vertex of the triangular first link member 80 is connected to one end of the second link member 81 by means of a bolt 86 and a nut 87.

Figure 6:
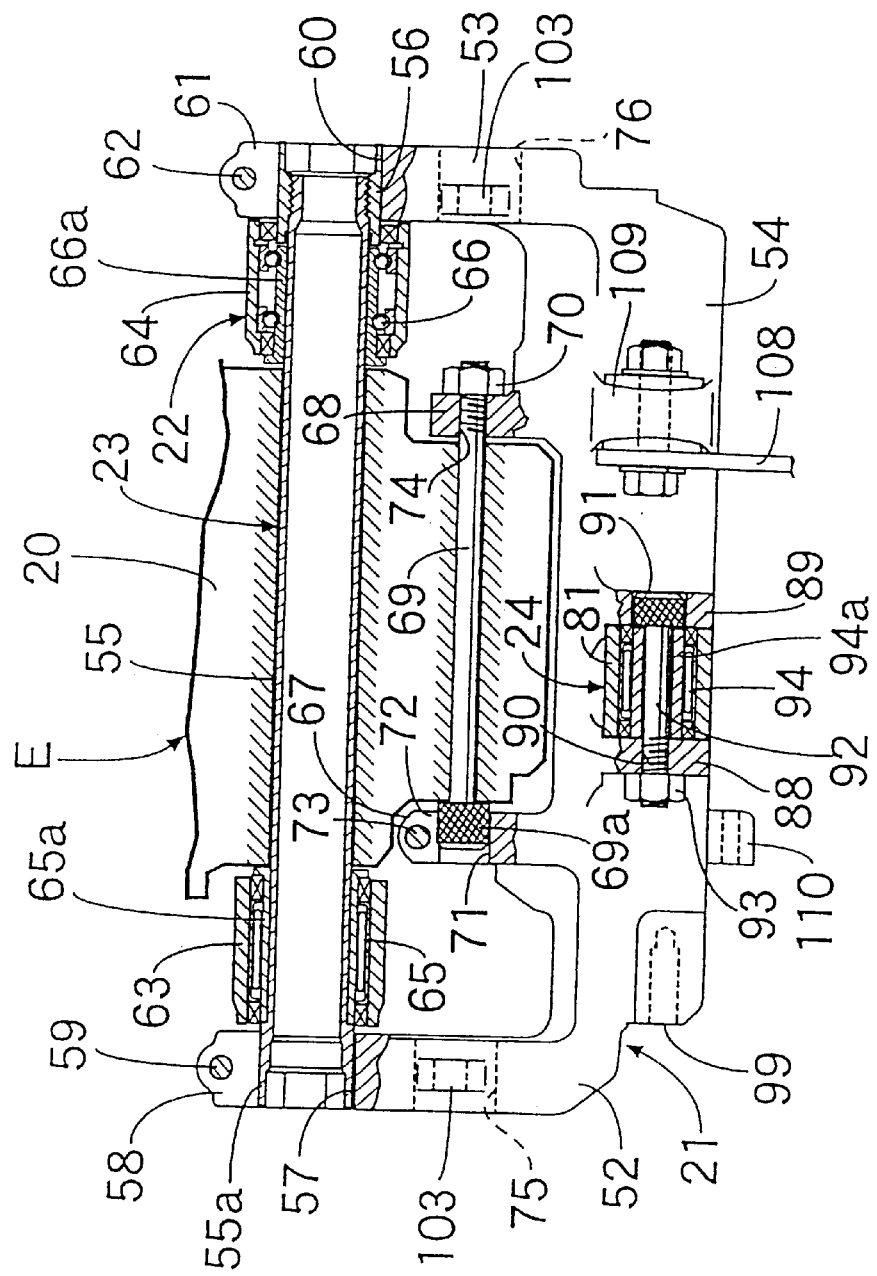
FIG. 6 is a sectional view taken on line 6—6 of FIG. 2.

As shown in FIG. 6, a pair of link connection portions 88 and 89 are provided on a rear portion of the cross-member portion 54 of the arm supporting member 21 so as to locate the other end of the second link member 81 therebetween. The link connection portion 88 has a shaft hole 90, and the link connection portion 89 has a shaft hole 91 which is disposed coaxially with the shaft hole 90 and is larger in diameter than the shaft hole 90.

A bolt 92 has at one end an enlarged diameter head 92a. The bolt 92 is allowed to pass through the other end portion of the second link member 81. At this time, the enlarged diameter head 92a at one end of the bolt 92 is inserted in the shaft hole 91, and the other end of the bolt 92 is inserted in the shaft hole 90. The other end of the bolt 92 (projecting from the shaft hole 90) is screwed with a nut 93 engaged with the outer side surface of the link connection portion 88. The other end portion of the second link portion 81 is turnably connected to the bolt 92 via a needle bearing 94 at a position between both the link connection portions 88 and 89. In this case, by fastening the nut 93 to the bolt 92 so as to put an inner ring 94a of the needle bearing 94 between the link connection portion 88 and the enlarged diameter head 92a, it is possible to turnably connect the other end of the second link member 81 to the arm supporting member 21, while avoiding loosening of the second link member 81 between both the link connection portions 88 and 89.

Figure 4:
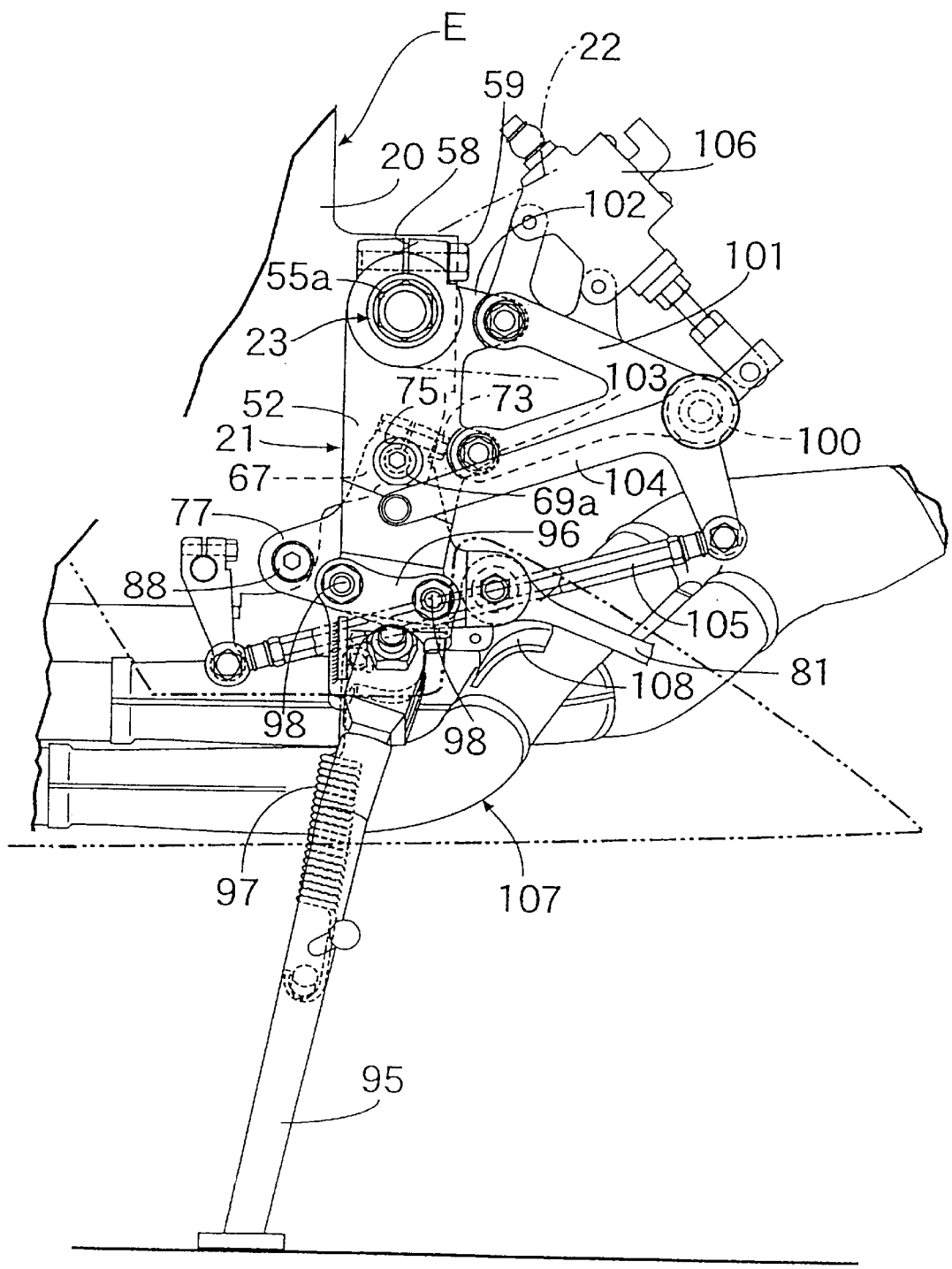
FIG. 4 is a side view, corresponding to FIG. 2, showing a structure for mounting parts to an arm supporting member.

Referring particularly to FIG. 4, a spring-up type side stand 95 is supported by a side stand bracket 96. A spring 97 for biasing the side stand 95 in the spring-up direction is provided between the side stand 95 and the side stand bracket 96. The side stand bracket 96 is mounted to the arm supporting member 21. To be more specific, a flat-shaped bracket mounting portion 99 for mounting the side stand bracket 96 by means of a pair of bolts 98 is provided on the side surface of the lower end portion of the left one of the brackets 52 and 53, that is, the bracket 52 of the arm supporting member 21.

Right and left steps 100 on which a rider sitting on the main seat 39 is to be rested are supported by triangular holders 101. A pair of upper and lower holder mounting portions 102 and 103 for mounting the holders 101 project from the rear portions of the brackets 52 and 53 of the arm supporting member 21.

A change pedal 104 to be actuated by the left foot of a rider is supported by the left holder 101 in such a manner as to be turnable around the same axial line as that of the step 100. The change pedal 104 is connected to the transmission in the engine E via a link 105. A detector 106 for detecting the turning position of the change pedal 104, that is, the number of speeds established by the transmission is mounted on the left holder 101.

A brake lever (not shown) to be operated by a right foot of a rider is mounted on the right holder 101 so as to be turnable around the same axial line as that of the step 100.

In an exhaust system 107 of the engine E including the exhaust pipes 35 and the exhaust muffler 36, a portion is slightly offset to the upstream side from the exhaust muffler 36, and has a supporting plate 108 welded thereto. The supporting plate 108 is fastened to an exhaust system supporting portion 109 projecting from a rear right portion of the cross-member portion 54 of the arm supporting member 21. That is to say, the exhaust system 107 is supported by the exhaust system supporting portion 109 of the arm supporting member 21 via the supporting plate 108.

A cowl supporting portion 110 for fastening the lower cowl 44 projects from a lower portion of the cross-member portion 54 of the arm supporting member 21. Therefore, the lower cowl 44 is also supported by the arm supporting member 21.

Figure 7:
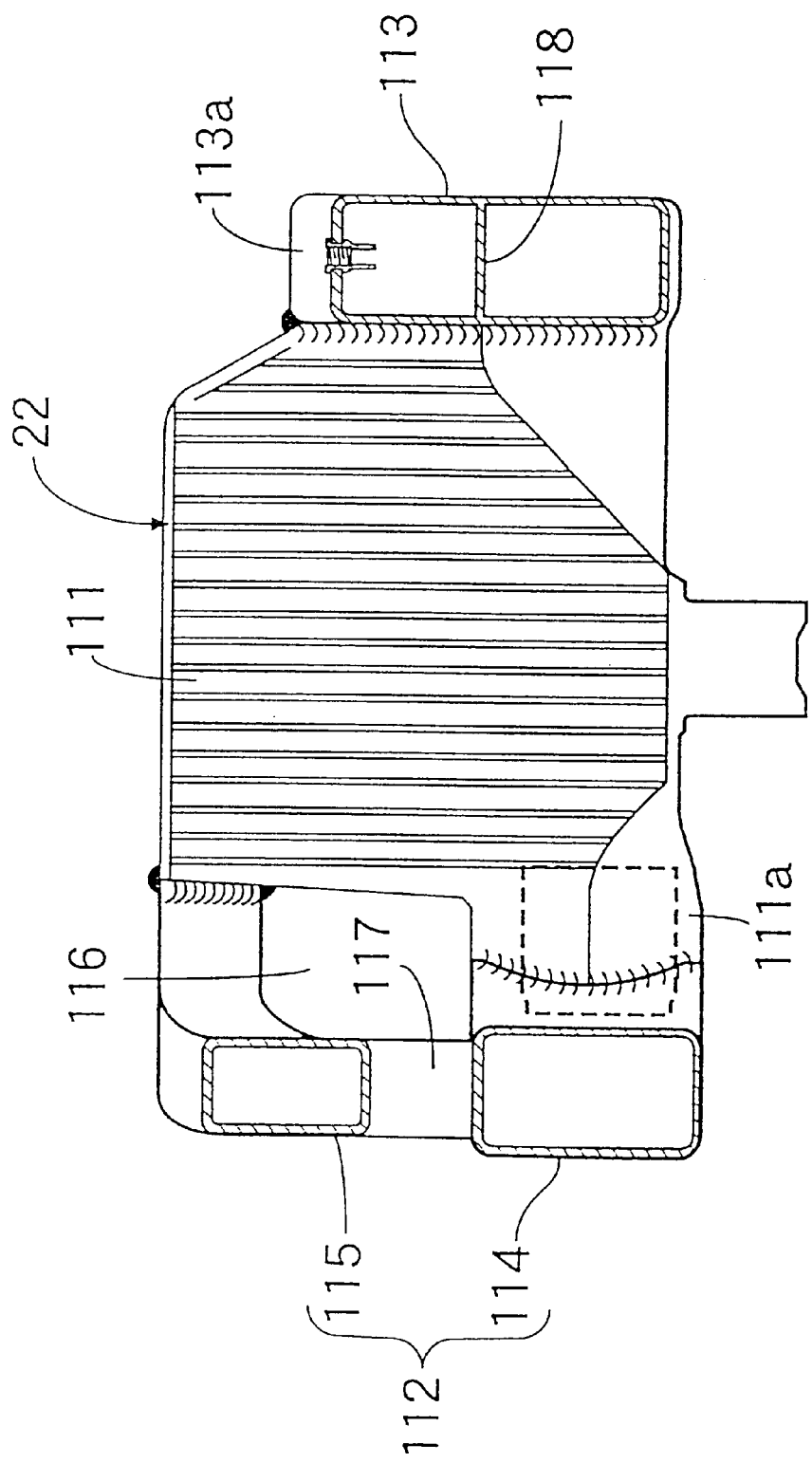
FIG. 7 is a sectional view taken on line 7—7 of FIG. 2.

Referring particularly to FIG. 7, the rear swing arm 22 includes a cross-member 111 formed into a box-shape by casting, and first and second arms 112 and 113 welded to both the rear side ends of the cross-member 111 and extending rearwardly therefrom. The cross-member 111 has at its front end the pair of integral right and left rotatably supporting portions 63 and 64 swingably supported by the crank case 20 of the engine E via the supporting shaft 23. The rear wheel WR is rotatably supported between the rear ends of the first and second arms 112 and 113.

A projecting portion 111a is integrally provided on a lower left portion of the cross-member 111 so as to project between the upper and lower running positions of the chain 30 for transmitting a power of the engine E to the rear wheel WR. The front end of a first pipe 114 formed into a square shape in cross-section is welded to the lower rear end of the cross-member 111 on the chain 30 side, that is, to the rear end of the projecting portion 111a. The first pipe 114 extends rearwardly from the cross-member 111. The first arm 112 includes the first pipe 114 and a second pipe 115 formed into a square shape in cross-section. The front end of the second pipe 115, which is welded to the upper rear end of the cross-member 111 on the chain 30 side, extends rearwardly therefrom. The rear end of the second pipe 115 is welded to the rear end of the first pipe 114. An intermediate portion of the first pipe 114 is connected to an intermediate portion of the second pipe 115 by means of a reinforcing member 117.

The front end of the second pipe 115 is curved to form a space 116, in which the chain 30 is to be disposed, between the projecting portion 111a and the front end of the second pipe 115. The chain 30 passes through the space 116 and extends inwardly from the first arm 112.

The second arm 113 is formed into a hollow square shape in cross-section. A rib 118 is integrally provided on the inner side of the second arm 113 for partitioning the inside of the second arm 113 into two parts, thereby reinforcing the second arm 113. It should be noted that a plurality of reinforcing ribs may be provided for partitioning the inside of the second arm 113 into a plurality of parts.

The second arm 113 is formed by extrusion so as to have the same transverse sectional shape over the entire length in the longitudinal direction, and is then swaged so that an upper surface 113a becomes a rearwardly, downwardly tilted surface.

Figure 8:
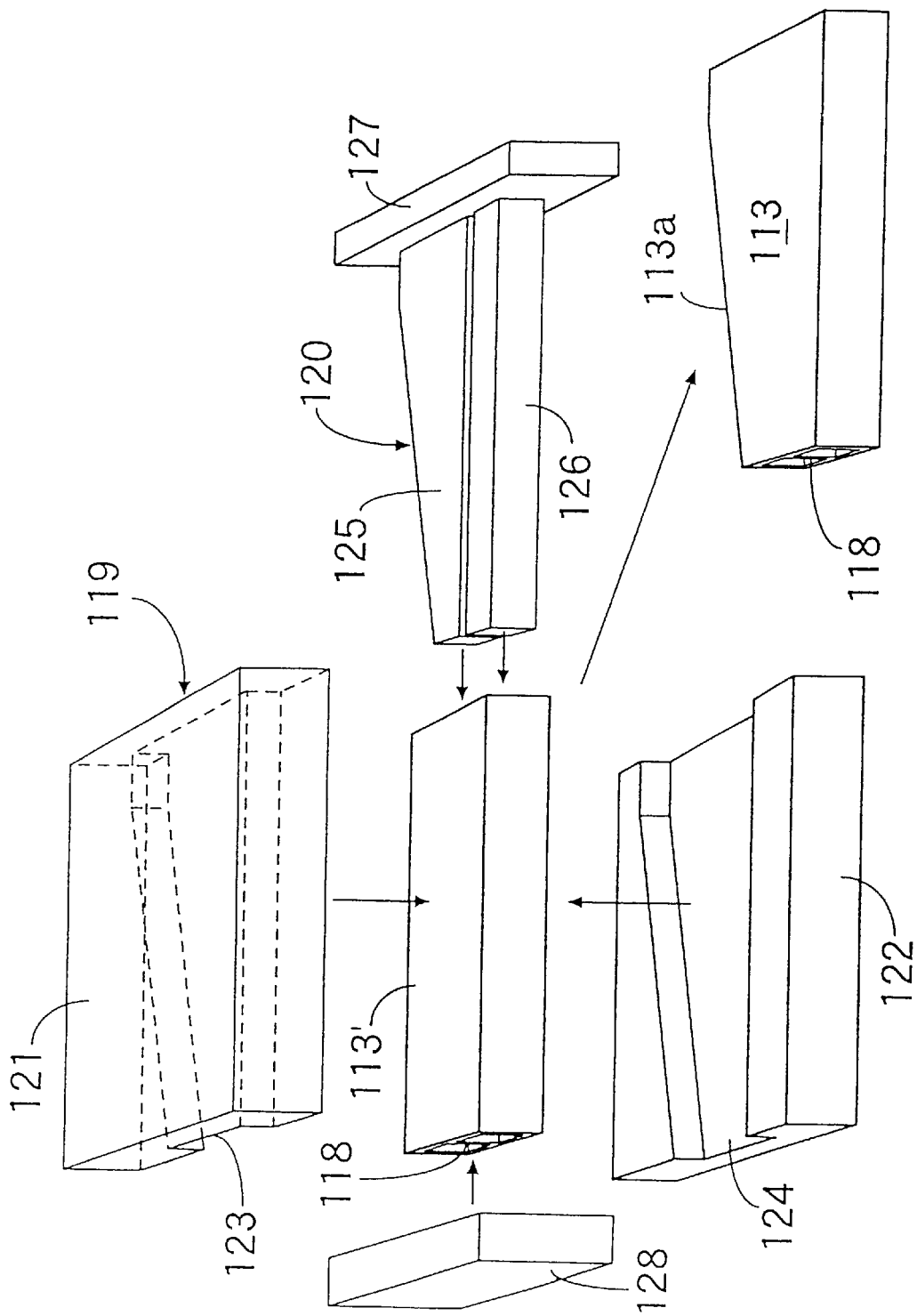
FIG. 8 is a perspective view showing the step of forming a second arm of the rear swing arm.

Referring to FIG. 8, a workpiece 113' having been formed by extrusion is swaged by using a split die 119 and a punch die 120. The split die 119 includes an upper die 121 and a lower die 122 movable close to or apart from each other. The opposed surfaces of both the dies 121 and 122 have, respectively, recesses 123 and 124 for forming the outer surface shape of the second arm 113 in cooperation with each other when the split die 119 is closed.

The punch die 120 includes a forming portion 125 for forming the upper inner surface of the second arm 113, and a forming portion 126 for forming the lower inner surface of the second arm 113. The punch die 120 has a stopper 127 for restricting the movement end of the punch die 120 when the punch die 120 is inserted in the split die 119 in the die closing state.

After the workpiece 113' is inserted in the upper and lower dies 121 and 122, both the dies 121 and 122 are clamped to close the split die 119; the end portions, opposed to the punch die 120, of the recesses 123 and 124 of both the dies 121 and 122 are closed by means of a stopper 128; and the punch die 120 is pressedly inserted between both the dies 121 and 122 by a cylinder (not shown), to form the second arm 113.

The vertical width of the second arm 113 is maximized at the front end, and the entire vertical length of the front end of the second arm 113 is welded to the rear end, opposed to the chain 30, of the cross-member 111.

Bearing members 130 and 131 are welded to the rear ends of the first and second arms 112 and 113 of the rear swing arm 22, and an axle 132 of the rear wheel WR is supported by the bearing members 130 and 131.

Collars 134 and 135 are held on the outer surface sides of both the bearing members 130 and 131 so as to be slidable in the longitudinal direction, respectively, and both the ends of the axle 132 are inserted in and held by the collars 134 and 135.

Figure 9:
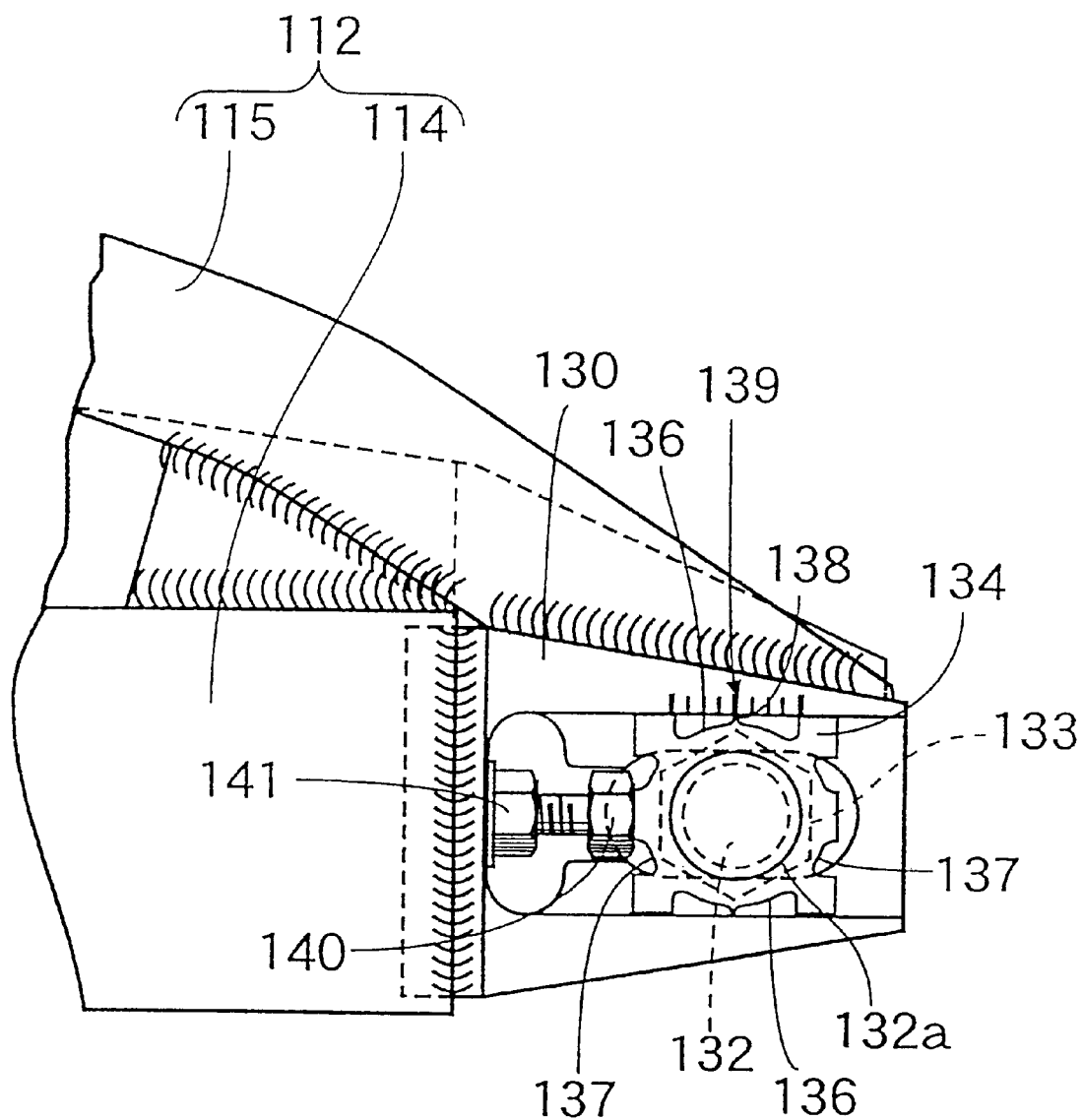
FIG. 9 is an enlarged view of a portion 9 of FIG. 2.

Referring to FIG. 9, the collar 134 is formed, by extrusion, into a shape which is basically rectangular but has lightening portions 136 and 137 formed on the outer surface. Alignment marks 138 projecting upwardly from the lightening portions 136 are provided at the center portions on both upper and lower surfaces of the collar 134. A scale 139 is provided in the longitudinal direction on the bearing member 130 in matching to the upper surface of the collar 134. The longitudinal position of the collar 134 can be checked by aligning the alignment mark 138 to the scale 139.

The other collar 135 is formed into the same shape as that of the collar 134 by extrusion, and the scale 139 is also provided on the bearing member 131.

An enlarged diameter portion 132a engaged to the outer side surface of the collar 134 is provided at one end of the axle 132, and a nut 133 engaged to the collar 135 is screwed with the other end, projecting from the collar 135, of the axle 132.

Two adjusting bolts 140 to be brought into contact with the front sides of the collars 134 and 135 are screwed in the rear ends of the first and second arms 112 and 113 so as to movable in the longitudinal direction, respectively. The longitudinal positions of the collars 134 and 135 (or, the longitudinal position of the axle 132) can be adjusted by adjusting the longitudinal positions of the adjusting bolts 140, whereby the tension of the chain 30 can be adjusted. Lock-nuts 141 are screwed on the adjusting bolts 140. The longitudinal positions of the adjusting bolts 140 can be held by engaging the lock-nuts 141 to the rear ends of the first and second arms 112 and 113.

The operation of this embodiment will now be described. According to this embodiment, the arm supporting member 21 includes the pair of right and left brackets 52 and 53 fixed at both the ends of the supporting shaft 23 supported by the crank case 20 of the engine E, and the cross-member portion 54 for integrally connecting the lower ends of the brackets 52 and 53 to each other. The cross-member portion 54 is supported by the crank case 20 at the two locations separated downwardly from the supporting shaft 23. The pair of right and left rotatably supporting portions 63 and 64 provided at the front end portion of the rear swing arm 22 for rotatably supporting the rear wheel WR are swingably supported by the supporting shaft 23 at the positions between both the brackets 52 and 53 and the crank case 20.

Accordingly, both the rotatably supporting portions 63 and 64 provided at the front end portion of the rear swing arm 22 are swingably supported between the engine E and the arm supported member 21 forcibly supported by the plurality of portions of the engine E, so that the supporting rigidity of the rear swing arm 22 to the engine E can be enhanced.

Since the link mechanism 24 is provided between the arm supporting member 21 and the rear swing arm 22, the link mechanism 24 can be forcibly supported by the arm supporting member 21 forcibly supported by the engine E.

Both the brackets 52 and 53 have the shaft holes 57 and 60, respectively. The supporting shaft 23 passes through the crank case 20 with its axial position relative to both the rotatably supporting portions 63 and 64 fixed, and both the ends of the supporting shaft 23 are inserted in the shaft holes 57 and 60. One or both (both in this embodiment) of the brackets 52 and 53 have the slit portions 58 and 61 continuous to the inner surfaces of the shaft holes 57 and 60, and the fastening bolts 59 and 62 are screwed in the slit portions 58 and 61, to make narrow the widths of the slit portions 58 and 61, thereby reducing the diameters of the shaft holes 57 and 60, respectively.

Accordingly, it is easy to position both the rotatably supporting portions 63 and 64 in the direction along the axial line of the supporting shaft 23 irrespective of the accuracy of the gaps between both the side surfaces of the portion, which supports the supporting shaft 23, of the crank case 20 and both the brackets 52 and 53, and the accuracy of widths of both the rotatably supporting portions 63 and 64, and hence it becomes easy to fix the brackets 52 and 53 to both the ends of the supporting shaft 23.

The arm supporting member 21 is provided with the exhaust system supporting portion 109 for supporting the exhaust system 107 including the exhaust muffler 36, the bracket mounting portion 99 for mounting the side stand bracket 96 for turnably supporting the side stand 95, the upper and lower pairs of holder mounting portions 102 and 103 for mounting holders 101 for supporting the steps 100, and the cowl supporting portion 110 for fastening the lower cowl 44, and accordingly, the exhaust system 107, side stand 95, steps 100, and lower cowl 44 are supported by the arm supporting member 21. As a result, it is possible to eliminate the necessity for supporting members specially designed to support the exhaust system 107, side stand 95, steps 100 and lower cowl 44, and hence to reduce the number of parts.

The rear swing arm 22 includes the box-like cross-member 111; the first pipe 114 welded at its front end to the lower rear end, on the chain 30 side, of the cross-member 111 and extending rearwardly therefrom; the second pipe 115 welded at its front end to the upper rear end, on the chain 30 side, of the cross-member 111 so as to form the chain arrangement space 116 between the cross-member 111 and the second pipe 115 and extending rearwardly therefrom, the second pipe 115 being welded to the rear end of the first pipe 114 to constitute the first arm 113 in cooperation with the first pipe 114; and the second arm 113 welded at its front end to the entire vertical length of the rear end, on the side opposed to the chain 30 side, of the cross-member 111 and extending rearwardly therefrom, with the upper surface 113a tilted rearwardly and downwardly. The rear wheel WR is rotatably supported between the rear ends of the first and second arms 112 and 113.

According to the rear swing arm 22 having this configuration, it is possible to hold the cross-member 111 at a sufficiently high level while ensuring the chain arrangement space 116, and hence to give a sufficient torsional rigidity to the rear swing arm 22. Further, since the second arm 113 is formed into a hollow square shape in cross-section by swaging after extrusion, it is possible to reduce the weight of the second arm 113 and hence to reduce the weight of the rear swing arm 22.

Since the collars 134 and 135, which are longitudinally slidably supported by the bearing members 130 and 131 at the rear end of the rear swing arm 22 while supporting the axle 132 of the rear wheel WR, are formed by extrusion, the lightening brackets 136 and 137 on the outer side surfaces of the collars 134 and 135 and the alignment marks 138 can be easily formed without machining.

While the embodiment of the present invention has been described in detail, the present invention is not limited thereto, and it is to be understood that various changes in design may be made without departing from the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A rear swing arm supporting structure for a motorcycle, wherein a front end portion of a rear swing arm for rotatably supporting a rear wheel is swingably supported via a supporting shaft by an engine supported by a body frame, the rear swing arm supporting structure comprising:

an arm supporting member, said arm supporting member being separated from the body frame and being unitarily formed by casting, and having upper end portions of a pair of right and left brackets for holding both ends of the supporting shaft, and a cross-member portion for connecting lower end portions of the brackets to each other, the cross-member portion having a plurality of projecting portions for attaching to the engine at a plurality of positions under the supporting shaft;

a pair of right and left rotatably supporting portions provided at the front end portion of the rear swing arm, the pair of rotatably supporting portions being swingably supported by the supporting shaft at positions between the brackets and the engine; and a link mechanism having a first triangular link member and a second straight link member, the first triangular link member being attached to a lower portion of the rear swing arm, the second straight link member being attached to a portion of the cross-member portion, wherein a vertex of the first triangular link is connected to a cushion member forward of an attachment point of the first and second link members, and a forward end of the second link member is connected to the cross member-portion at a position rearward and downward from said projecting portions for attaching the engine.

2. The rear swing arm supporting structure according to claim 1, wherein the brackets each have individual shaft holes for receiving an end portion of the supporting shaft.

3. The rear swing arm supporting structure according to claim 2, wherein the right and left rotatably supporting portions are positionable, respectively, between a portion of the engine and the brackets.

4. The rear swing arm supporting structure according to claim 2, wherein one or two of said brackets have slit portions continuous to inner surfaces of the shaft holes of the brackets, and fastening bolts for making narrow widths of the slit portions, thereby reducing a diameter of the shaft holes.

5. The rear swing arm supporting structure according to claim 1, wherein the arm supporting member comprises an integral exhaust system supporting structure for supporting an exhaust system.

6. The rear swing arm supporting structure according to claim 5, wherein the exhaust system supporting structure projects from a portion of the cross-member portion.

7. The rear swing arm supporting structure according to claim 1, wherein the arm supporting member comprises a bracket mounting portion for mounting a spring-up kickstand.

8. The rear swing arm supporting structure according to claim 7, wherein the bracket mounting portion is provided on a side surface of a lower end portion of one of the brackets.

9. The rear swing arm supporting structure according to claim 1, wherein the arm supporting member comprises a pair of upper and lower holder mounting portions for mounting holders which facilitate first and second step members.

10. The rear swing arm supporting structure according to claim 9, wherein the pair of upper and lower holders mounting portions project from rear portions of the brackets.

* * * * *